March 11, 1930. H. E. PARTRIDGE 1,750,426
CONVEYER
Filed Jan. 5, 1929
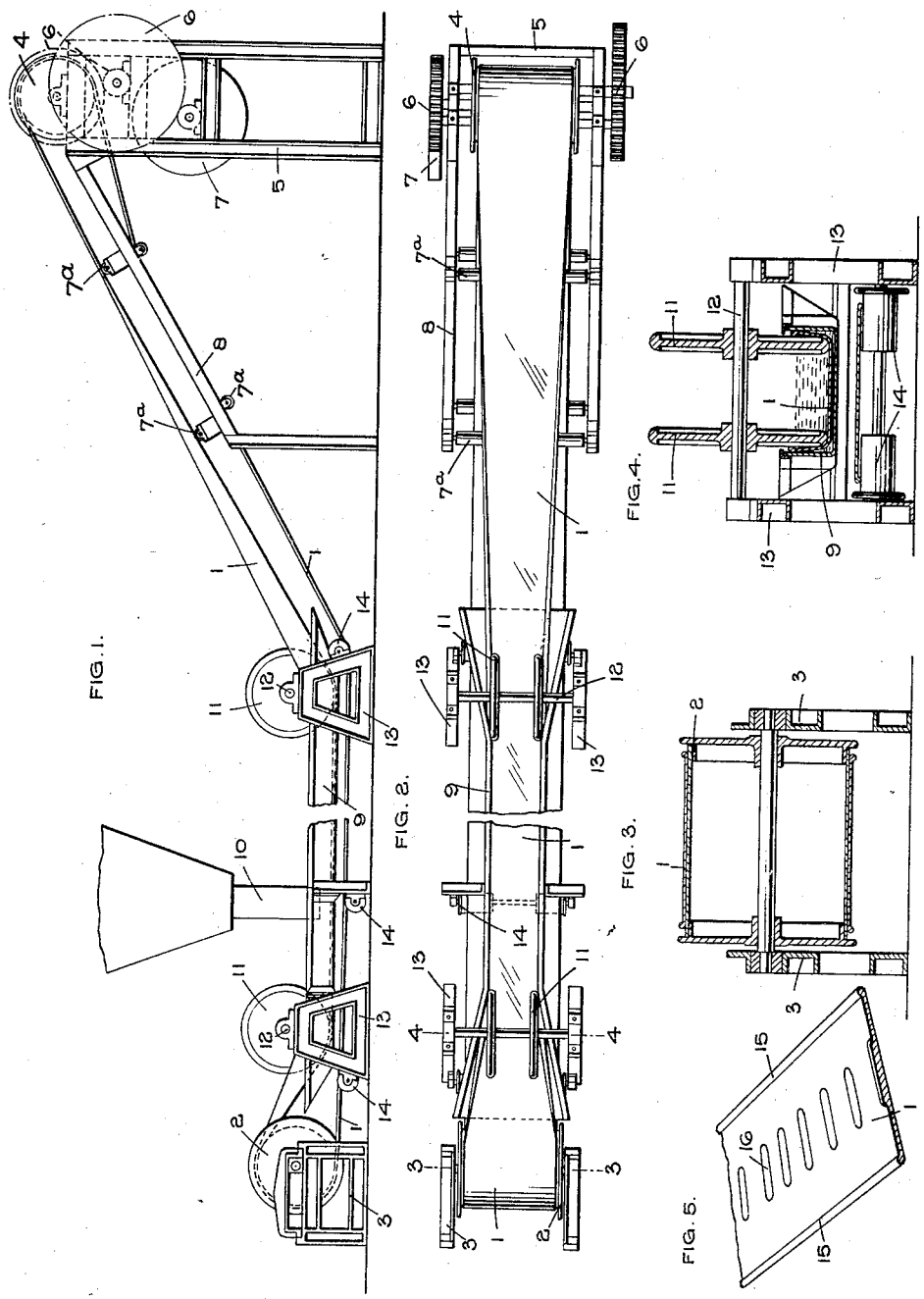
INVENTOR
Harry E. Partridge
BY
ATTORNEYS Patented Mar. 11, 1930  1,750,426

UNITED STATES PATENT OFFICE

HARRY EWART PARTRIDGE, OF FINCHFIELD, WOLVERHAMPTON, ENGLAND, ASSIGNOR OF ONE-HALF TO JOHN THOMPSON (DUDLEY) LIMITED, OF DUDLEY, ENGLAND

CONVEYER

Application filed January 5, 1929, Serial No. 330,459, and in Great Britain January 24, 1928.

This invention relates to conveyers of the endless belt type and has for its object to provide an improved conveyer which can be applied to a variety of purposes.

The present invention is applicable for quenching and removing furnace or gas producer ashes or for quenching and removing metal articles after heat treatment.

The invention is also applicable as a hydromechanical conveyer and separator and can be used for separating solid or semi-solid matter from liquids, for instance, separating detritus from sewage liquor or separating the heavier constituents of china clay fluid from the lighter constituents thereof.

In accordance with the present invention I provide a conveyer comprising an endless belt constructed from flexible material, guiding members for supporting said belt at its ends, and means for distorting the belt intermediate its ends into channel cross section.

As applied for quenching and removing ashes or metal articles after heat treatment the hot ashes or articles are allowed to drop into the liquid by which they are quenched and they are subsequently conveyed by the endwise movement of the belt to a position from which they can be delivered into a chute or passed to other delivery apparatus.

As applied to a hydromechanical separator the liquid may be fed to the endless belt in a direction which is transverse to the direction of travel of the belt and the lighter liquid is allowed to pass away over one side of the belt which acts as a weir or over one side of a channel in which the belt is travelling while the detritus or heavier material is carried by the conveyer belt to a suitable delivery point. That side of the belt or channel which acts as a weir may be lower than the opposite side of the belt or channel.

The belt may run substantially flat at the ends of its travel while the intermediate portion which may depend into loop like form may be caused to assume channel section by means of a rigid former placed beneath or at the sides of the belt in conjunction with pulleys or wheels which engage the upper and inner surface of the belt near the ends of the former whereby the edges of the belt are bent upwardly or the centre part of the belt is depressed.

By means of this arrangement a portion of the length of the belt is made to assume the form of an elongated pocket without interfering with the normal endwise travel of the belt and at the ends of this pocket like portion of the belt the belt may be substantially flat.

If a flat belt is used which is to run in a trough containing the liquid then the end portions of the belt must be raised so as to clear the ends of the trough and the belt is carried over guide pulleys or their equivalents which may or may not be positively driven for causing the belt to take the required form.

In carrying my invention into effect it is preferred to employ a belt of special construction and this belt may be made partly or wholly of india rubber or india rubber may be used having a metal reinforcement.

As it is desired to distort the belt at certain positions into channel form and it is at the same time necessary for the belt to pass over guide pulleys it is desirable that the centre part of the belt should be capable of expansion longitudinally in order to compensate for the difference in radius of the centre part and the edge parts when passing under or over the guide pulleys and for this reason I may employ a special construction of belt made of rubber or other elastic material the centre portion of which is formed as transverse corrugations which, however, preferably die away towards the edges of the belt. Further, the edges of such a belt may be thickened or provided with beaded edges the beads being upon the upper surface of the belt at its longitudinal edges.

Such a belt also has the advantage that it more readily grips the ashes or articles or material which is to be conveyed by it and further the centre part of the belt can readily be caused to assume relatively flat form, i. e. free from corrugations at the delivery point if required.

Referring to the drawings:—

Figure 1 is a side elevation of a conveyer constructed in accordance with my invention.

Figure 2 is a plan view of same.

Figure 3 is a section on the line 3—3 in Figure 2.

Figure 4 is a section on the line 4—4 in Figure 2.

Figure 5 is a perspective view of a portion of the belt.

In the construction of conveyer illustrated by Figures 1 to 5 of the accompanying drawings the apparatus includes a belt 1 which is constructed from flexible material and includes an intermediate substantially horizontal portion and two upwardly inclined portions at its ends.

The one end of the belt passes around a supporting guide drum 2 which is carried by a frame or supporting member 3 within which the drum is preferably adjustably mounted in order that the position of the drum may be readily adjusted to take up any slackness of the belt due to wear.

The opposite end of the belt passes around a further drum 4 carried by a supporting frame work 5, the drum 4 being adapted to be driven through the medium of gearing 6 and a suitable driving pulley 7 which may be driven by any suitable method.

The upwardly inclined portion of the belt adjacent the drum 4 preferably passes around suitable idler rollers 7a which are carried by an extension 8 of the frame 5.

The belt where it passes around the guide rollers 2 and 4 is substantially flat but at its horizontal part the belt is caused to assume a substantially trough or channel shape, the horizontal portion passing through a liquid containing trough or tank 9 which is disposed beneath a hopper or other member 10 by which the articles or material are adapted to be delivered into the tank or trough 9.

The walls of the trough or tank 9 at their ends diverge outwardly to facilitate the entry and exit of the moving belt, the belt during its passage through the tank being caused to assume a substantially channel or trough shape by means of two pairs of wheels or rollers 11 each pair being carried by an axle 12 supported within bearings carried by brackets or supports 13 disposed upon either side of the trough.

The wheels or rollers 11 dip into the liquid contained in the trough and engage with the belt upon its upper surface, these wheels or rollers being spaced apart to enable the material or articles which are being acted upon to pass between them.

The lower part of the belt is adapted to pass beneath the tank 9 and is guided by means of suitable idler pulleys or rollers 14.

The belt preferably employed is one which is constructed of rubber or other similar flexible material and as shown clearly in Figure 5 has its edges beaded or reinforced at 15 upon its upper surface, the central part of the belt upon its upper surface being further provided with a plurality of transverse projections which form a non-slipping surface for the material or articles to be acted upon.

The projecting portions or members 16 are preferably disposed only upon that portion of the belt which constitutes its base portions when distorted into substantially channel or trough shape when passing through the liquid containing tank.

In order that the projections or members 16 shall not foul the idler pulleys or rollers, the pulleys or rollers are preferably spaced apart to enable the projections forming the non-slipping surface to pass between them.

In operation the material or articles to be acted upon by the liquid contained in the trough 9 are fed into the trough by any suitable means such as the hopper 10, the articles or material falling on to the upper surface of that portion of the belt which is disposed within the trough and which is of course, moving in an endwise direction the material or articles being carried by the belt throughout the length of the trough and thence delivered to a chute or other delivery point.

Claims:

1. A conveyer comprising an endless belt constructed from flexible material, guiding drums for supporting the ends of the belt and around which the belt is adapted to pass, means for driving one of said drums and causing said belt to move in an endwise direction, a liquid containing tank for receiving the intermediate part of the belt depending into said tank in the form of a loop and wheels dipping into said liquid containing tank and engaging with the upper surface of the belt and causing that part of said belt passing through said liquid tank to be distorted into channel or trough shape, said wheels being spaced apart to allow material carried by the belt to pass between them.

2. A conveyer comprising an endless belt constructed from flexible material, guiding drums for supporting the ends of the belt and around which the belt is adapted to pass, means for driving one of said drums and causing said belt to move in an endwise direction, a liquid containing tank of channel cross section for receiving the intermediate part of the belt depending into said liquid containing tank in the form of a loop, and wheels dipping into said liquid containing tank and engaging with the upper surface of the belt and causing that part of said belt passing through said liquid tank to be distorted into channel or trough shape and to engage with the inner surface of the tank walls, said wheels being spaced apart to allow material carried by the belt to pass between them.

3. A conveyer comprising an endless belt constructed from flexible material, a tank for containing liquid, guiding drums disposed at each end of said tank for supporting the ends of the belt and disposed at a higher level than the tank, means for driving one of said drums and causing said belt to move in an endwise direction, the intermediate part of the belt depending into the liquid containing tank in the form of a loop, guide rollers carried by a suitable framework being provided intermediate the tank and the guiding drums for supporting those parts of the belt disposed between the tank and guiding drums, and wheels dipping into said tank and engaging with the upper surface of the belt and causing that part of the belt passing through the tank to be distorted into a channel or trough shape.

In witness whereof I affix my signature.

HARRY EWART PARTRIDGE.